D. W. DAKE.
Butter-Workers.
No. 144,662.                              Patented Nov. 18, 1873.
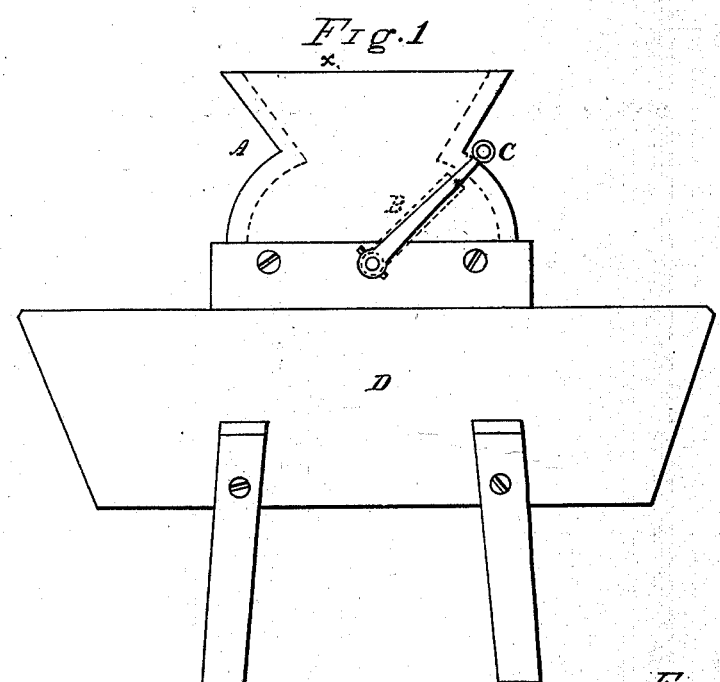
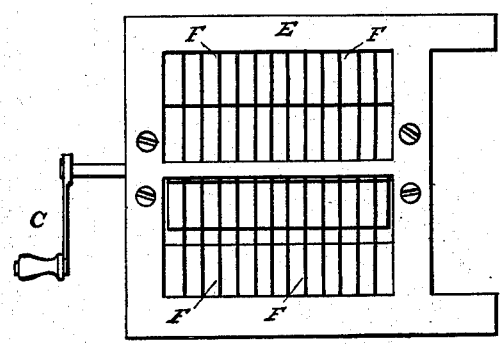
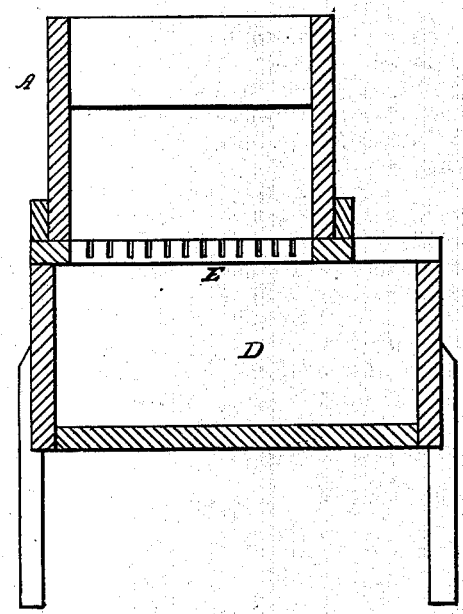
WITNESSES.                                INVENTOR.

UNITED STATES PATENT OFFICE.

DANIEL W. DAKE, OF BELOIT, WISCONSIN.

IMPROVEMENT IN BUTTER-WORKERS.

Specification forming part of Letters Patent No. 144,662, dated November 18, 1873; application filed June 9, 1873.

*To all whom it may concern:*

Be it known that I, DANIEL W. DAKE, of Beloit, in the county of Rock and State of Wisconsin, have invented certain new and useful Improvements in Butter-Workers, of which improvements the following is a full, clear, and exact description, which will enable others skilled in the art to which my invention appertains to make and use the same, reference being had to the accompanying drawings forming a part hereof, and in which—

Figure 1 is a side elevation of my improved worker; Fig. 2, a bottom view of the hopper, and of the frame in which the knives are set, the frame being attached to the hopper; and Fig. 3 a cross-section in the plane of the line *x x*.

My invention relates to that class of devices intended for the purpose of working and re-working butter, either in small or in large quantities. A butter-worker of this class is shown and described in Letters Patent issued to me the 14th day of January, 1873, and numbered 134,788. In that device I employed a hopper provided with a sieve-bottom made of wire-cloth. The object of this invention is to facilitate the operation of working hard butter in workers of the class hereinabove referred to; and to that end my invention consists in employing, in lieu of the said wire-cloth, thin blades or knives arranged at suitable distances apart in a removable frame attached to the bottom of the hopper, the said blades having their edges set to receive the butter.

In the drawing, A represents the hopper. B is the presser, and C is the crank by means of which the presser is operated. D is a vat to receive the shredded butter. E is a frame arranged below the hopper, and F F are thin blades or knives arranged across the frame E at suitable distances apart, and having their cutting-edges set to receive the butter. I deem it preferable, but not essential, to arrange one or more cross-bars, *e*, across the frame E, and to attach the latter firmly to the hopper. The frame E is mortised to receive and support the knives, as indicated in Fig. 3, and is removable from the hopper. In working comparatively soft butter, a wire sieve-bottom may be arranged between the frame E and the hopper, and this wire bottom may be removed when hard butter is again worked.

With the exception of the frame E and knives F F, the construction and operation of the worker herein shown and described is the same as the construction and operation of the worker shown and described in the Letters Patent hereinbefore referred to.

Having thus described my invention, what I claim as new, and desire to secure by Letters Patent, is—

The combination and arrangement of the hopper A, presser B, crank C, frame E, and knives F F, in connection with a vat to receive the butter pressed from the hopper, substantially as and for the purposes specified.

DANIEL W. DAKE.

Witnesses:
N. C. GRIDLEY,
F. F. WARNER.